US008745108B2

(12) United States Patent
Jansson (10) Patent No.: US 8,745,108 B2
(45) Date of Patent: Jun. 3, 2014

(54) DISPLAY CONFIGURATION FOR MULTIMODE ELECTRONIC CALIPERS HAVING A RATIOMETRIC MEASUREMENT MODE

(75) Inventor: Bjorn E. B. Jansson, Snorhomish, WA (US)

(73) Assignee: Mitutoyo Corporation, Kawasaki-shi (JP)

(*) Notice: Subject to any disclaimer, the term of this patent is extended or adjusted under 35 U.S.C. 154(b) by 1021 days.

(21) Appl. No.: 12/633,697

(22) Filed: Dec. 8, 2009

(65) Prior Publication Data

US 2011/0137967 A1 Jun. 9, 2011

(51) Int. Cl.
*G06F 13/00* (2006.01)
*G06F 15/02* (2006.01)

(52) U.S. Cl.
CPC ................................. *G06F 15/02* (2013.01)
USPC ........................................................ 708/170

(58) Field of Classification Search
None
See application file for complete search history.

(56) References Cited

U.S. PATENT DOCUMENTS

| 4,879,508 | A | 11/1989 | Andermo | |
|---|---|---|---|---|
| 5,023,559 | A | 6/1991 | Andermo | |
| 5,841,274 | A | 11/1998 | Masreliez | |
| 5,886,519 | A | 3/1999 | Masreliez | |
| 5,894,678 | A | 4/1999 | Masreliez | |
| 5,973,494 | A | 10/1999 | Masreliez | |
| 6,002,250 | A | 12/1999 | Masreliez | |
| 6,011,389 | A | 1/2000 | Masreliez | |
| 6,493,738 | B1 * | 12/2002 | Yoshimi | 708/551 |
| 7,246,032 | B2 * | 7/2007 | Feldman | 702/158 |
| 2006/0106568 | A1 * | 5/2006 | Feldman | 702/158 |
| 2007/0055475 | A1 * | 3/2007 | Feldman | 702/158 |

* cited by examiner

*Primary Examiner* — Henry Tsai
*Assistant Examiner* — Aurangzeb Hassan
(74) *Attorney, Agent, or Firm* — Christensen O'Connor Johnson Kindness PLLC (57) ABSTRACT

A multimode electronic measuring instrument is provided that includes a ratiometric mode of operation. During the ratiometric mode, a desired dimension is established as a stored reference dimension $X_{ref}$. After the reference dimension is stored in memory, subsequent ratiometric measurement readouts will equal a current measurement distance $X_{curr}$ divided by the reference dimension $X_{ref}$. A persistent number of decimal places used to the right of the decimal point as seen on a display is determined based on a current reference dimension $X_{ref}$, an increment used for the least significant digit, and an internal measurement resolution of the multimode electronic measuring instrument.

20 Claims, 6 Drawing Sheets

DISPLAY CONFIGURATION FOR MULTIMODE ELECTRONIC CALIPERS HAVING A RATIOMETRIC MEASUREMENT MODE

FIELD OF THE INVENTION

The invention relates generally to electronic calipers, micrometers, digital scales, and similar length and angle measuring devices. More particularly, it relates to electronic calipers and the like that can be operated using a simplified control method to provide either ratiometric measurements or measurements in terms of conventional distance or angle units.

BACKGROUND

Most electronic calipers, dividers, and the like that are currently in use provide measurements only in conventional length or angle units such as inches, millimeters, degrees, or radians. Furthermore, devices that provide such measurements, particularly in the case of commercially-available electronic calipers, have become near-commodities. Elements such as the user-controlled functions, the number and spacing of the buttons to activate the functions, and the dimensions of the electronic housing and the LCD display portion have settled into a narrow range of configurations. These configurations provide the manufacturability, economical, functionality, and ergonomic factors that are expected or required by a majority of manufacturers and users of electronic calipers. As such, manufacturers and users are reluctant to accept design variations that may have undesirable effects, such as increasing the user-controlled functional complexity, increasing the number of buttons or decreasing their ergonomic spacing, increasing the ergonomic dimensions of the electronic housing, or decreasing the ergonomic visibility of LCD display elements, etc., even to a moderate extent.

If such undesirable effects are taken into account and mitigated during the design of electronic calipers, however, additional features may be added and accepted in new designs. An example of such a feature on an electronic caliper may be found in commonly-assigned U.S. Pat. No. 7,246,032, to Feldman (hereinafter "the '032 Patent"), herein incorporated by reference in its entirety. The '032 Patent discloses an electronic caliper with a ratio-measuring mode. In the ratio-measuring mode, a ratio is determined from a reference measurement and a current measurement, such that the current measurement is divided by the reference measurement to display a ratio of the two measurements. Using an electronic caliper in this way allows a user to measure not only a ratio of dimensions of physical objects, but also a ratio on scaled drawings or other blueprint type plans, for example. As the caliper arms are moved, the current measurement changes and so, too, does the ratio displayed on the screen.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

With known calipers that include a ratiometric measuring mode (e.g., as disclosed in the '032 patent), the position of the decimal point and thus the number of decimal places displayed to the right of the decimal point are not optimized. In one example, the position of the decimal point on the display may vary (or float) as the current measurement changes, making it difficult for a user to read the displayed ratio. In another example, the number of decimal places displayed may be fixed, but may not be optimal for a particular reference dimension. For example, it may have an inappropriate or invalid resolution for at least part of the available measuring range, or worse, known methods for providing a resolution corresponding to the fixed number or decimal places may result in an unreliable ratio calculation. In various exemplary embodiments according to the present invention, the optimal position of the decimal point is calculated in real-time (e.g., at the time the reference dimension is set) and remains fixed or persistent throughout the ratiometric measuring mode of operation for a given reference dimension. In some embodiments, the optimal number of decimals or the optimal decimal point position may be determined in combination with an optimal increment used for the least significant digit (LSD) of the display, such as 1, 2, and 5, so as to provide an easy-to-read and reliable readout during the ratiometric measuring mode of operation. In various embodiments, the persistent number of decimal places and the increment used for the least significant digit of the displayed ratiometric measurement values are determined such that the increment used for the least significant digit corresponds to a measurement increment that is at least as large as the internal measurement resolution of the multimode measurement instrument.

A plurality of decimal point positions are provided on the display so as to have different candidate positions of the decimal point available, because different reference measurement dimensions have a different corresponding ratiometric measuring ranges available within the measuring range of the caliper. For example, if a reference measurement value is small and a subsequent measured value is large compared to the small reference measurement value, then the ratio displayed will be large (e.g., much greater than 1.0, with few decimal places required). Conversely, if a reference measurement value is large and a subsequent measured value is small compared to the large reference measurement value, then the ratio displayed will be small (e.g., much less than 1.0, with several decimal places required). Thus, it is desirable to select an optimal decimal point position to display a corresponding number of decimal places to the right of the decimal point for each particular reference measurement value before ratiometric measuring begins.

It should be appreciated that the ratiometric measurement provided according to the previous description is significantly different from "scaled" measurements and displays found in prior art instruments. Scaled measurements and displays are basically used to multiply an underlying dimensional measurement provided by a transducer of an instrument by a selected factor. In contrast, a ratiometric measurement according to the disclosed subject matter is particularly useful for comparing two dimensions. That is, the display indicates the relationship of a current dimension to another readily-changed (reference) dimension, rather than just scaling the displayed value for a measured dimension. One benefit of the ratiometric measurement is that the calculated ratio may be displayed regardless of units of measurement.

The ratiometric measurement mode of operation described above is implemented, in various embodiments, using a simple and intuitive user interface, a simple and intuitive setting of the reference dimension, and a ratiometric measurement display with an optimized decimal display that is flexible, simple and intuitively understood.

Accordingly, the presently disclosed subject matter provides a method for displaying a ratiometric number in a multimode measurement instrument comprising a position-sensing transducer, the multimode measurement instrument having an internal measurement resolution. The method includes generally four steps. The first step involves operating the multimode measurement instrument to select a ratiometric measurement mode of operation using a mode-selecting feature included in a user interface of the multimode measurement instrument.

The second step involves operating the multimode measurement instrument to set a current reference dimension during the ratiometric measurement mode of operation. In some embodiments, the current reference dimension may be automatically set to a measurement value corresponding to a measurement position of multimode measuring instrument at the time that the ratiometric measurement mode of operation is selected. In some embodiments, the user interface of the multimode measurement instrument comprises a reference dimension setting element configured such that the user may activate the reference dimension setting element to set or replace the current reference dimension at various times. The third step involves operating the multimode measurement instrument to determine a persistent number of decimal places to be used in displaying ratiometric measurement values that are based on the current reference dimension, wherein the persistent number of decimal places is determined based, at least in part, on the current reference dimension. The fourth step involves operating the multimode measurement instrument to automatically display ratiometric measurement values using the persistent number of decimal places, wherein the ratiometric measurement values are determined based on a current measurement derived from the position-sensing transducer and the current reference dimension. In various embodiments, if the second step is repeated during the ratiometric measurement mode of operation such that a new current reference dimension is set, then the third and fourth steps are subsequently performed based on that new current reference dimension.

In various embodiments, the persistent number of decimal places is determined such that an increment used for displaying the least significant digit (e.g., a "conventional" increment of 1, in some embodiments) corresponds to a measurement increment that is at least as large as the internal measurement resolution of the multimode measurement instrument.

Additionally, the presently-disclosed subject matter provides a multimode measurement instrument having at least two relatively moveable members for making measurements. The multimode measurement instrument includes: a display configured to display the measurements made from a relationship between the at least two relatively moveable members; a mode-selecting element configured to select a ratiometric mode of operation; and a control element configured to automatically cause the display to show a ratiometric number based on the relationship between the at least two relatively moveable members and a reference dimension set in the ratiometric mode of operation, wherein the ratiometric number has a persistent number of decimal places determined, at least in part, based on the reference dimension.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following descriptions, reference numbers generally having the same suffix digits or trailing digits refer to analogous or identical elements, unless otherwise indicated by description or context. As such, the description of one or more such similar elements will be understood to apply to other similar elements unless otherwise indicated by description or context.

Figure 1:
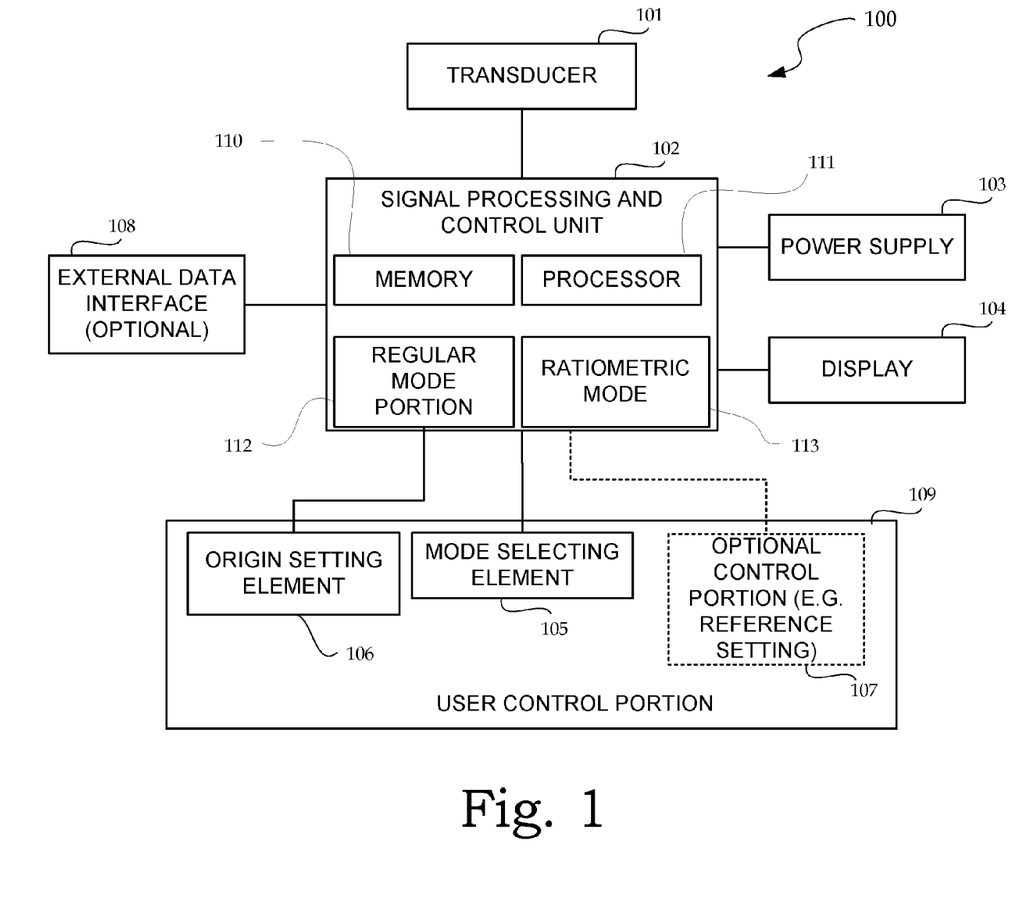
FIG. 1 is a block diagram showing one exemplary embodiment of a multimode measuring instrument system including a ratiometric measurement mode.

FIG. 1 is a block diagram illustrating one exemplary embodiment of a multimode measuring instrument system 100 including a ratiometric measurement mode. As shown in FIG. 1, the multimode measuring instrument system 100 includes a transducer 101, a signal processing and control unit 102, a power supply 103, a display 104, a user control portion 109 and may, optionally, include an external data interface 108 usable to connect the signal processing and control unit 102 to exchange control signals and/or measurement data with an external computer or device (not shown). Additionally, the signal processing and control unit 102 may include a memory 110, a processor 111, a regular mode element 112, and a ratiometric mode element 113. It should be understood that the signal processing and control unit 102 may have different or additional components, but this need not affect the function or operation as described below for the processing and control unit 102 in relation to displaying a number of decimal places in a ratiometric mode of operation according to this invention.

The user control portion 109 includes a mode-selecting element 105, origin-setting element 106, and an optional control element 107 that may provide various other user control functions. In various applications, a physically independent display device (not shown) displays information based on data received through the external data interface 108 and the display 104 that is typically connected and assembled with the signal processing and control unit 102 that optionally may be omitted in such applications.

The transducer 101 may comprise any convenient type of dimensional measurement transducer, including angular measurement transducers, linear measurement transducers, or the like. When the multimode measuring instrument system 100 is part of a low-power and portable handheld measurement device, it is advantageous to use a capacitive or inductive transducer such as those described in detail in U.S. Pat. Nos. 4,879,508; 5,023,559; 5,841,274; 5,894,678; 5,973,494; 6,002,250; and 6,011,389, for example, which are incorporated herein by reference in their entirety. Furthermore, in various embodiments, the transducer 101 comprises an absolute measurement type of transducer, such as those disclosed in U.S. Pat. Nos. 5,841,274, and 5,886,519, for example, which are incorporated herein by reference in their entirety. Certain operating advantages are provided when an absolute measurement type transducer is used in a multimode measuring instrument, as outlined further below.

In various embodiments, the signal processing and control unit 102 may include the memory 110 and processor 111 for storing and executing various instructions implemented by the signal processing and control unit 102. The memory 110 may be any device capable of storing and writing data for later use, even when no power is supplied to the memory 110. This may include, but is not limited to, a conventional hard drive device, RAM, ROM, any solid-state device, including removable and nonremovable devices, etc. The memory 110 is further configured to store computer-readable instructions that may be executed on the processor 111. The computer-readable instructions stored in the memory 110, when executed by the processor 111, implement the various functions as described herein with regard to the signal processing and control unit 102, but are not limited to such functions.

The signal processing and control unit 102 may also include the regular mode element 112 and the ratiometric mode element 113, as seen in FIG. 1. The regular mode element 112 and the ratiometric mode element 113 may be used in combination with, or separately from, the memory 110 and the processor 111 to implement their respective functions as described below. Additionally, the regular mode element 112 and the ratiometric mode element 113 may each comprise its own respective memory and processor (both not shown) for executing their respective functions. As with the memory 110, any individual memory incorporated in the regular mode element 112 or the ratiometric mode element 113 may be of a type including, but not limited to, a hard drive, a solid state device, including both removable and nonremovable devices, RAM, ROM, etc.

In various embodiments, the power supply 103 may comprise a solar cell, a miniature 1.5-volt or 3-volt battery, or the like. The incorporated references include detailed descriptions of the design and operation of various components usable in a multimode measuring instrument system, including components usable for the signal processing and control unit 102 and the power supply 103. In various embodiments, the display 104 may comprise a compact custom or dot-matrix LCD display. However, in general, now-known or later-developed display types that provide the desired operating characteristics may be used. It will be appreciated that each of these components, as well as the additional components described below, may be interconnected by one or more data/control buses and/or application programming interfaces, or by direct connections between the various elements.

The user control portion 109 includes the origin-setting element 106, the mode-selecting element 105, and may include the optional control element 107 that may include various other user control elements or provide other functions, as described further below. The mode-selecting element 105 allows the operator to determine or select the mode of operation of the multimode measuring instrument system 100. In particular, the mode-selecting element 105 allows the user or operator to select at least two modes of operation. A first mode is a conventional, or regular, measurement mode, wherein the multimode measuring instrument system 100 is usable to measure the dimensions of objects and display the measurement results in conventional units such as inches, millimeters, or other conventional or predetermined units.

The first mode of operation may be controlled, in part, by the regular mode element 112 of the signal processing and control unit 102.

A second mode is a ratiometric measurement mode, wherein the multimode measuring instrument system 100 is usable to measure the dimensions of objects and display the measurement results as a ratio between the dimension of the measured object and a previously-determined reference dimension. The second mode of operation may be controlled, in part, by the ratiometric mode element 113 of the signal processing and control unit 102. In various embodiments, the mode-selecting element 105 may be implemented, for example, as a button, a miniature touch-screen element, a voice-activated control circuit, or any other now-known or later-developed miniature low-power switching or selection element.

In one embodiment, the operations associated with the origin-setting element 106 include allowing the operator to determine or select a reference dimension that is operative during the ratiometric measurement mode of operation. In particular, the origin-setting element 106 allows the user or operator to trigger the input and storage of a reference-measured dimension in the memory 110 corresponding to a current position of the transducer 101. The origin-setting element 106 may also, optionally, provide other functions as outlined further below. In various embodiments, the origin-setting element 106 may be implemented, for example, as a button, a miniature touch-screen element, a voice-activated control circuit, or any other now-known or later-developed miniature low power switching or selection element.

To operate in either the conventional or the ratiometric measurement mode as controlled, in part, by the regular mode element 112 and the ratiometric mode 113, respectively, the user or operator activates the mode-selecting element 105, for example, by pressing a button, speaking toward the multimode measuring instrument system 100 to activate voice recognition commands, etc., depending on the implementation of the mode-selecting element 105. This will set the signal processing and control unit 102 to operate in one of the modes, depending on the indicated selection.

If the ratiometric measuring mode is set, the desired reference dimension must be set. In one embodiment, the reference dimension may be set to an initial or default value corresponding to whatever the position or dimension of the multimode measuring instrument system 100 was at the time that the ratiometric measurement mode was activated. In various embodiments, the reference dimension may be set and/or altered by physically adjusting the multimode measuring instrument system 100 to a desired position or dimension after the ratiometric measurement mode has been activated, and then activating the origin-setting element 106 (e.g., by pressing a button, speaking toward the multimode measuring instrument system 100 to activate voice recognition commands, etc., depending on the implementation of the origin-setting element 106). In any case, after the reference dimension has been set, any subsequent measurement taken using the multimode measuring instrument system 100, where the transducer 101 signals that a measurement sample has been taken, will be displayed on the display 104 as a number equal to the ratio of the current position or measurement of the transducer 101 to the reference position or dimension. The ratio value may be determined by any method that, in effect, divides the current position or measurement of the transducer 101 by the stored reference position or dimension, as will be discussed in more detail below.

In one embodiment, when the mode-selecting element 105 is activated a first time, it places the multimode measuring instrument system 100 in the conventional mode state of operation in which the measurements are displayed in inches. If the mode-selecting element 105 is activated a second time, the multimode measuring instrument system 100 will remain in the conventional mode of operation, but will display measurements in units of millimeters, and so on for as many units of measurement as are capable of display in the multimode measuring instrument system 100. If the mode-selecting element 105 is activated an additional time and the multimode measuring instrument system 100 has exhausted the possible units of measurement in the conventional mode of operation, the multimode measuring instrument system 100 will then be placed in the ratiometric mode of operation, as previously discussed. However, this particular sequence of operations of the mode-selecting element 105 is exemplary only, and not limiting.

Figure 2:
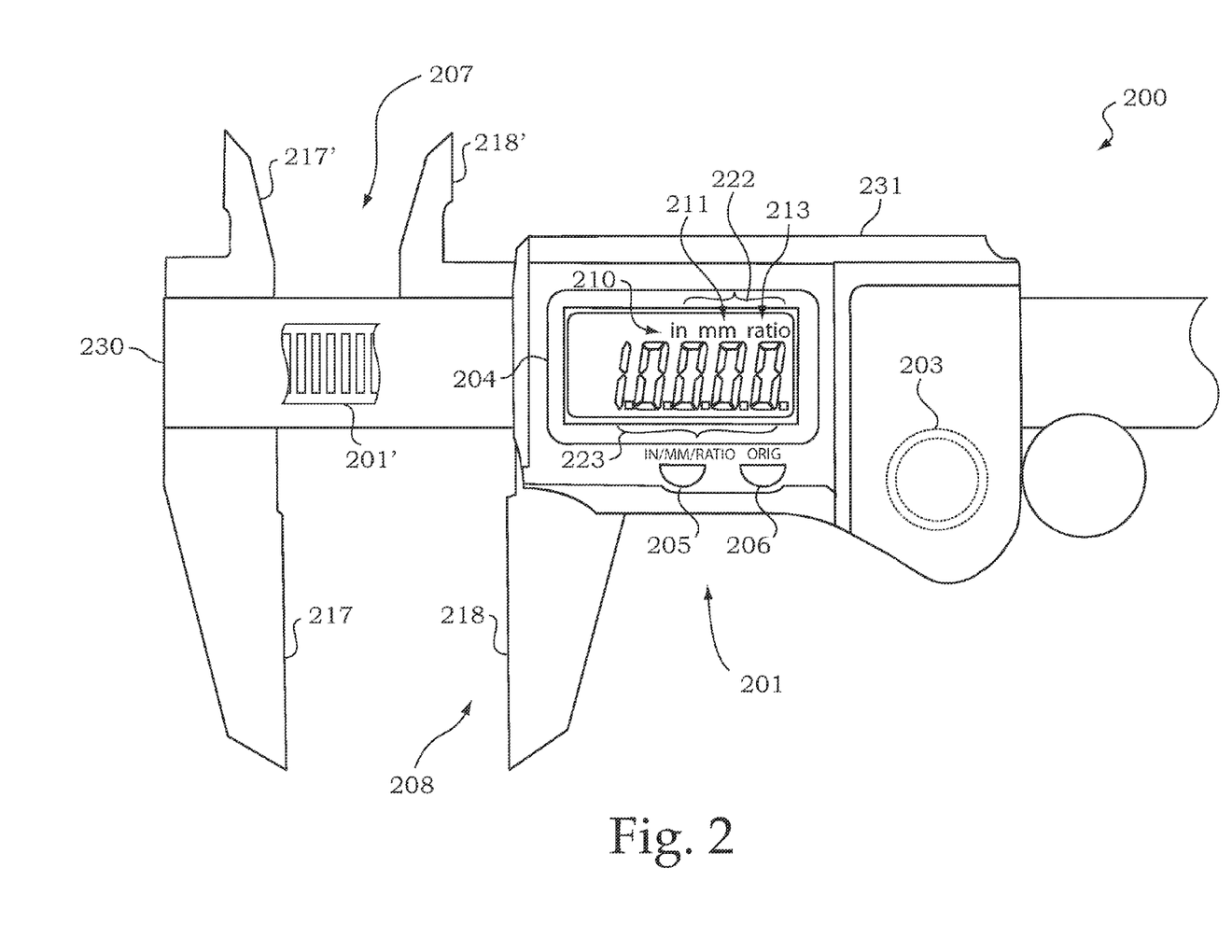
FIG. 2 is an illustration showing a portion of a first embodiment of a multimode measuring instrument including a ratiometric measurement mode.

FIG. 2 shows a portion of a first embodiment of a multimode measuring instrument 200 including a ratiometric measurement mode, also referred to as a multimode caliper 200, in which the multimode measuring system 100 is implemented. The multimode caliper 200 includes a scale member 207 and a read-head member 208. The scale member 207 may be a conventional electronic caliper member comprising jaw portions 217 and 217' and a spar portion 230 carrying a transducer scale 201', a portion of which is revealed in FIG. 2. The read-head member 208 may be a conventional electronic caliper member including jaw portions 218 and 218', and a guide and mounting portion (not shown) that aligns and guides the read-head member 208 along the spar 230 and carries a read-head assembly 201. The guide and mounting portion underlies the read-head assembly 201, as shown in FIG. 2, and is approximately the same size as the read-head assembly 201.

In the embodiment shown in FIG. 2, the read-head member 208 carries the transducer read-head assembly 201, also referred to simply as read-head assembly 201, which includes a display 204, a power supply battery 203 (located internally and shown in dashed outline), a mode-selecting button 205, and an origin-selecting button 206. The read-head assembly 201 also includes a transducer read-head (not shown) that is operable to provide signals indicative of the position of the transducer read-head assembly 201 along the transducer scale 201' to the signal processing and control unit 102 as previously outlined with reference to FIG. 1.

The display 204 generally comprises an alphanumeric measurement display portion 223 and a mode indicator display portion 222. The display may be a custom LCD display, a dot matrix display, or any other type of display capable of displaying the type of information described herein. In the embodiment shown in FIG. 2, the display 204 is a custom liquid crystal display (LCD) including the mode indicator portion 222 and the alphanumeric measurement display portion 223, which is capable of displaying alphanumeric digits. In some embodiments, each alphanumeric digit displayed on the alphanumeric measurement display portion 223 may comprise at least seven line segments, not all of which are shown for each digit in FIG. 2. Also, the alphanumeric measurement display portion 223 may have more than one usable decimal point location, as seen in FIG. 2 (five such locations are shown).

The mode indicator portion 222 is capable of displaying conventional measurement mode/unit indicators such as "in" for mode indicator 210 and "mm" for mode indicator 211, which indicate units of inches and millimeters, respectively. There is also a ratiometric measurement mode indicator 213 that displays "ratio" when the multimode caliper 200 is in a ratiometric measuring mode. These indicators may take any convenient written or symbolic form and are not restricted to the exemplary "in," "mm," and "ratio" forms. It should be appreciated that the conventional measurement units of inches or millimeters are exemplary only, and not limiting. More generally, the conventional measurement mode(s) may display measurements in any desired conventional or predetermined units, and may have corresponding indicators.

In one embodiment, when activated, the mode-selecting button 205 selects the operating mode and/or units of measurement displayed by the multimode caliper 200. In one embodiment, the user may cycle through the modes by repeatedly activating (e.g., pressing) the mode-selecting button 205. When the "in" mode indicator 210 is active, the measuring instrument 200 is in inches mode, and the value displayed on the alphanumeric measurement display portion 223 is in units of inches. When the "mm" mode indicator 211 is active, the measuring instrument 200 is in millimeter mode, and the value displayed on the alphanumeric measurement display portion 223 is in units of millimeters. When the "ratio" mode indicator 213 is active, the multimode caliper 200 is in ratio mode, and the value displayed on the alphanumeric measurement display portion 223 may be a number that is a ratio of a current distance between the relatively moveable members 217 (or 217') and 218 (or 218') to a reference distance previously stored as determined by the distance between the relatively moveable members 217 (or 217') and 218 (or 218'), as described in greater detail below.

To obtain a measurement of an object while in the inches or millimeter mode, the user separates the jaw portions 217 and 218 to a desired distance, such that their respective measuring edges contact the measurement object. Generally, the alphanumeric measurement display portion 223 displays the distance between the measuring edges of the relatively-moveable members 217 and 218 which are in contact with the measuring object. In many conventional electronic calipers, an origin or zero button can be pressed with the jaw portions 217 and 218 at a selected separation or offset distance. Thereafter, that offset distance is subtracted from the measured distance prior to display. In various exemplary embodiments, the origin-selecting button 206 may provide the previously-described function when the multimode caliper 200 is operating in a conventional measurement mode, and a different function, a reference dimension setting function when the multimode caliper 200 is operating in a ratiometric measurement mode.

As previously outlined, in one embodiment, if the user wishes to obtain a ratiometric measurement of an object dimension, after entering the ratiometric measurement mode the user may separate the relatively-moveable members 217 and 218 to a desired reference distance or dimension. For example, the movable members 217 and 218 may be moved to match a dimension of a 3-dimensional object, a dimension of an illustrated part of an object in a blueprint, or the like. Once the relatively moveable members 217 and 218 are separated to the desired reference distance, the origin-selecting button 206 may be activated. The separation between the measuring edges of the relatively moveable members 217 and 218 is defined as the reference dimension $X_{ref}$ and stored in the memory 110 by the signal processing and control unit 102. Alternatively, in some embodiments, the signal processing and control unit 102 is connected such that a user may set the reference dimension $X_{ref}$ to an initial or default value corresponding to whatever the position or dimension of the multimode caliper 200 was at the time that the ratiometric measurement mode was activated. In some embodiments, the reference dimension $X_{ref}$ may be set by means of a remote console connected to the external data interface 108 (shown in FIG. 1).

After the reference dimension $X_{ref}$ is set, the alphanumeric measurement display portion 223 will initially (e.g., prior to a change in the position of the multimode caliper 200) display a numerical value of one (1) as the ratiometric measurement value. In particular, there will be a decimal point displayed immediately to the right of the digit "1", followed by a number of decimal places to the right of the decimal point. According to this invention, the number of decimal places is determined based at least in part on the reference dimension, as discussed below in more detail. After a reference dimension $X_{ref}$ is set (and/or stored in the memory 110), any subsequent readout on the alphanumeric measurement display portion 223 while operating in the ratiometric mode will equal the current measurement distance $X_{curr}$ divided by the reference dimension $X_{ref}$, as seen in EQUATION 1 below.

As one example illustrating the intuitive and useful operation of this mode, a user may wish to estimate the value of a point included on a graph. The user would first match the measuring edges of the jaw portions 217 and 218 to the dimension of the 100% scale graduation mark on the graph axis, and then the user may either activate the ratiometric mode of measurement to set the reference dimension, or if already in the ratiometric measurement mode, activate the origin-selecting button 206, thereby saving the current dimension as the reference dimension $X_{ref}$ in the memory 110. The user would then match the measuring edges of the jaw portions 217 and 218 to the separation between any other graph point and the zero axis or match the measuring edges of the jaw portions 217 and 218 to the separation between any two points along the calibrated direction, which automatically establishes the separation dimension as $X_{curr}$. The ratiometric measurement $X_{ratio}$, which is the ratio of the current dimension $X_{curr}$ to the reference dimension $X_{ref}$, is displayed on the alphanumeric measurement display portion 223 and is determined from the following equation:

$$X_{ratio} = X_{curr}/X_{ref} \qquad \text{(Eq. 1)}$$

Figure 3A:
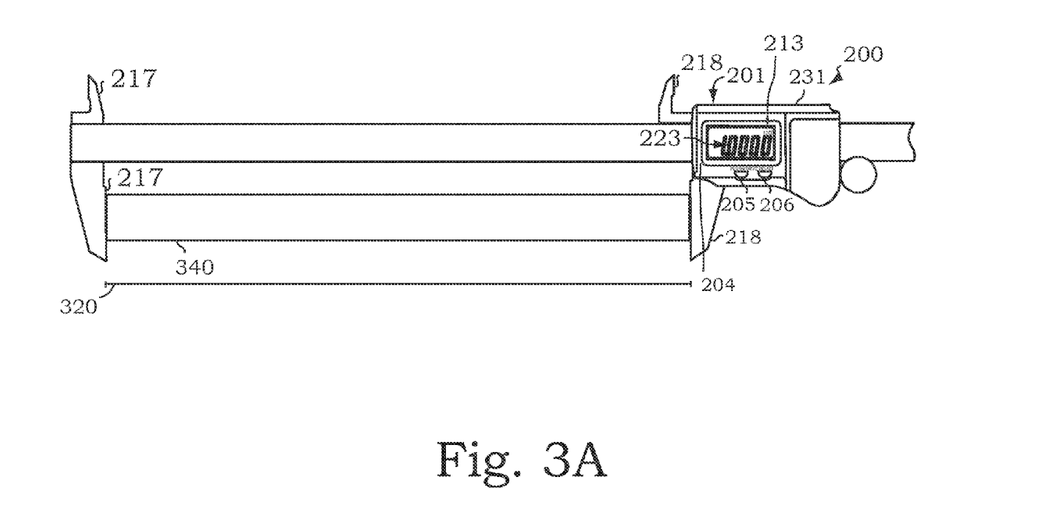
FIGS. 3A and 3B are illustrations showing an exemplary first set of operations that perform a first measurement in a ratiometric mode of operation.
Figure 3B:
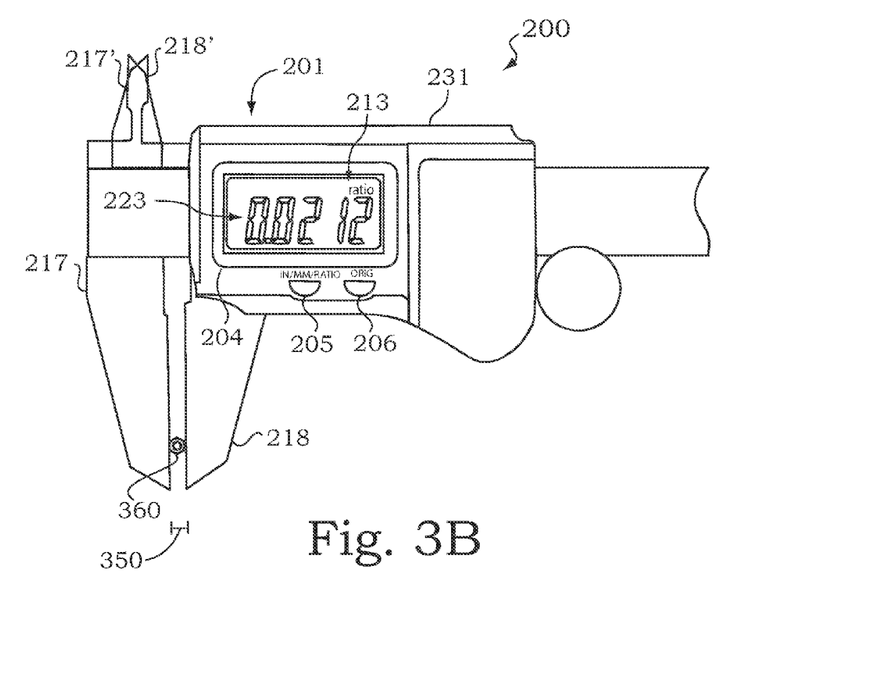

FIGS. 3A and 3B are illustrations showing an exemplary first set of operations that perform a first measurement in the ratiometric mode of operation with a large reference dimension $X_{ref}$ compared to a small current measurement dimension $X_{curr}$. Together with the set of operations shown in FIGS. 4A and 4B, FIGS. 3A and 3B further clarify the ratiometric mode of operation of an electronic measuring device, such as the multimode caliper 200.

FIG. 3A shows the establishment of a reference dimension in a ratiometric caliper 200 based on a first large object 340. As previously outlined, to establish a reference dimension while in the ratiometric mode of operation, the user may match the measuring edges of the jaw portions 217 and 218 to a desired dimension, in this case the dimension 320 of the large object 340, and activates (e.g., presses) the origin-selecting button 206. The separation between the measuring edges is defined as the reference dimension $X_{ref}$ and is stored in the memory 110 by the signal processing and control unit 102. The alphanumeric display portion 223 immediately displays the "ratio" indicator 213 so as to show the multimode caliper 200 is in the ratiometric measurement mode. Initially, since the current measurement $X_{curr}$ is equal to the reference dimension $X_{ref}$, the ratiometric measurement value "1.0000" is displayed, as shown in FIG. 3A.

The number of decimal places displayed to the right of the decimal point of the value "1.0000" (four decimal places in the example of FIG. 3A) is automatically determined according to the reference dimension $X_{ref}$ and several pre-chosen factors, as later described in more detail with regard to FIGS. 5 and 6. These factors may include a desired increment value by which the displayed ratio value is to be incremented or decremented when the jaw portions 217 and 218 are moved after the reference dimension is set, a resolution value that is preset and that may correspond to the finest measurement resolution that may be provided in the operations of the multimode caliper 200, and a number base, such as base-10, that is to be used for displaying the determined ratiometric measurement value (also referred to simply as the ratio value or ratio measurement). In various embodiments, one of the criteria that may be applied when determining the number of decimal places is that an increment used for displaying the least significant digit (e.g., a "conventional" increment of 1, in some embodiments) corresponds to a measurement increment that is at least as large as the internal measurement resolution of the multimode measurement instrument.

As seen in the alphanumeric display portion 223 in the example of FIGS. 3A and 3B, the numerical value has four decimal places to the right of the decimal point. The number of decimal places chosen for display in FIG. 3A is determined based on the size of the object 340 with corresponding dimension 320 and the pre-chosen factors discussed above for determining the value "1.0000." As seen in FIG. 3A, the large object 340 causes the jaw portions 217 and 218 to open to approximately the full measuring capacity of the multimode caliper 200. In general, any subsequent measurement will result in a displayed ratio that is smaller than one (1) because the dimension 320 is already at the maximum length of the multimode caliper 200 and any subsequent object measured will be of a smaller size. Thus, a relatively larger number of decimal places (e.g., 4 decimal places) may be desired in order to provide a numerical display range that distinguishes a larger number of different measurement values from one another. In general, a ratio measurement is determined based on a comparison of the current dimension (e.g., the dimension 350 shown in FIG. 3B) to the reference dimension $X_{ref}$ established for the first large object 340 as described above. After the ratiometric mode is entered and the reference dimension $X_{ref}$ is set, the alphanumeric display portion 223 immediately and continuously displays the ratio $X_{ratio}$ of any current position $X_{curr}$, defined by the separation of the jaw portions 217 and 218, in proportion to the reference dimension $X_{ref}$.

As seen in FIG. 3B, there is a second small object 360 with a corresponding dimension 350 for which a ratio measurement is desired. In particular, FIG. 3B shows the state of the multimode caliper 200 after a user has matched the measuring edges of the jaw portions 217 and 218 to the corresponding dimension 350 of the small object 360. In this case, the alphanumeric display portion 223 immediately displays the ratio $X_{ratio}$ of the current measurement $X_{curr}$ to the reference dimension $X_{ref}$ as "0.0212." That is, the small object 360 is "0.0212" times the size of the large object 340. Further, the user knows that the $X_{ratio}$ value displayed is a ratiometric measurement, by reference to the display of the "ratio" mode indicator 213.

Figure 4A:
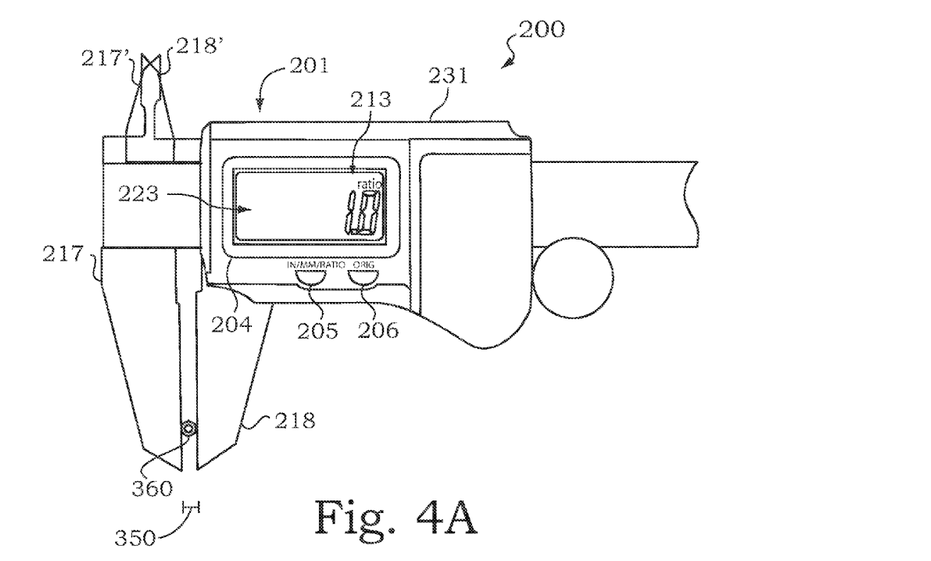
FIGS. 4A and 4B are illustrations showing an exemplary second set of operations that perform a second measurement, contrasting with the first measurement shown in FIGS. 3A and 3B, in a ratiometric mode of operation.
Figure 4B:
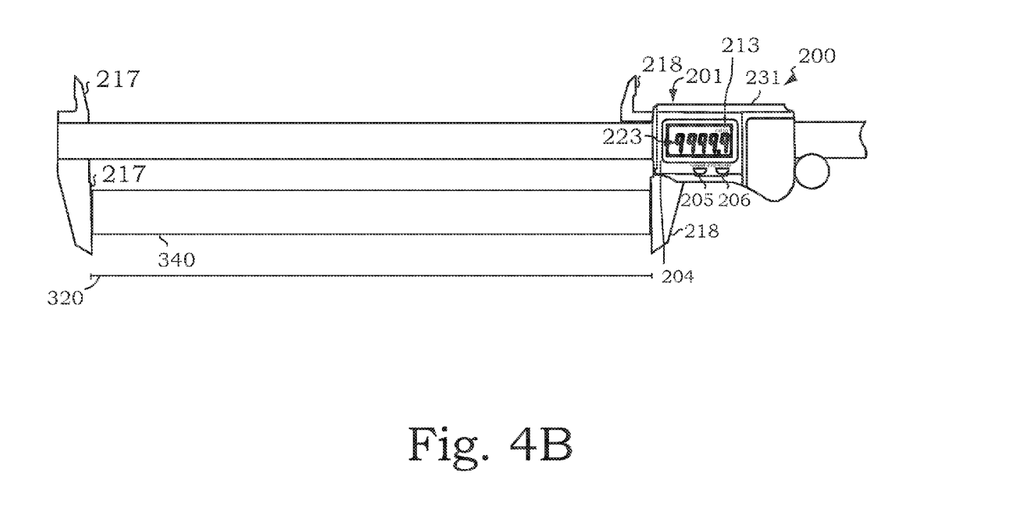

FIGS. 4A and 4B are illustrations showing an exemplary second set of operations that perform a second measurement in a ratiometric mode of operation in which the reference dimension $X_{ref}$ is small compared to a large current measurement dimension $X_{curr}$, in contrast to the measurement operations shown in FIGS. 3A and 3B. FIG. 4A shows the establishment of a reference dimension $X_{ref}$ in a ratiometric caliper 200 based on a small object 360. As previously outlined, to establish the reference dimension $X_{ref}$, the user may match the measuring edges of the jaw portions 217 and 218 to a desired dimension, in this case the dimension 350 of the small object 360, and activates (e.g., presses) the origin-selecting button 206. As described above, the separation between the measuring edges is defined as the reference dimension $X_{ref}$ and is stored in the memory 110 by the signal processing and control unit 102. The alphanumeric display portion 223 immediately displays the ratio $X_{ratio}$ of the current measurement $X_{curr}$ to the reference dimension $X_{ref}$. Similarly to the previous description with reference to FIG. 3A, since these dimensions are initially the same (until the jaw portions 217 and 218 are moved), the initial ratio value "1.0" is displayed on the alphanumeric display portion 223, as seen in FIG. 4A. However, as discussed in further detail below, due to the relatively small value of the reference dimension $X_{ref}$, the displayed value "1.0" does not contain as many decimal places to the right of the decimal point as compared to the initial value displayed in FIG. 3A.

In particular, the number of decimal places displayed to the right of the decimal point of the value "1.0" (one decimal place in the example of FIG. 4A) is automatically determined according to the reference dimension $X_{ref}$ and the pre-chosen factors outlined previously. Since the reference dimension $X_{ref}$ is small, when compared with the full measurement length of the multimode caliper 200, almost all measurements taken after the small reference dimension $X_{ref}$ is set will be larger than one (1). Thus, a relatively small number of decimal places (e.g., 1 decimal place), and a relatively larger number of digits to the left of the decimal point, may be desired in order to provide a numerical display range that distinguishes a larger number of different measurement values from one another.

The alphanumeric display portion 223 immediately and continuously displays any current measurement $X_{curr}$, defined by the separation of the jaw portions 217 and 218, in proportion to the reference dimension $X_{ref}$ as outlined above. FIG. 4B shows a ratiometric measurement in which a large object 340 is measured, in comparison to the small reference dimension established based on the small object 360 as described above. In particular, FIG. 4B shows the state of the multimode caliper 200 after a user has matched the measuring edges of the jaw portions 217 and 218 to the dimension 320 of the large object 340. In this particular example, the alphanumeric display portion 223 immediately displays the ratio value $X_{ratio}$ of "9999.9" of the current measurement $X_{curr}$ to the reference dimension $X_{ref}$. Coincidentally, this may indicate that the large object 340 is the largest object that provides a valid measurement display in the ratiometric mode for the given number of decimal places and the current reference dimension. However, one of ordinary skill will recognize that the display capability of the alphanumeric display 223 is a function of the characteristics of the display and in no way limits the scope of the disclosed subject matter. For example, a display with more than five displayable digits is fully contemplated within the scope of the disclosed subject matter.

In one embodiment, if the value of $X_{ratio}$ is greater than a predefined value $X_{max}$, which is the largest numerical representation possible for the alphanumeric display portion 223 given a particular number of decimal places, the display 204 may display an error message by activating whatever elements of the display that can be readily interpreted as an error message. For example, the occurrence of a value such as "9999.9" may be so rare in practice that it may be used as an error indicator, or the display may be configured to display "REF_X", a blinking alphanumeric representation, or a display analogous to the word "Error." The most suitable value of $X_{max}$ may be determined according to the properties of the display 104, the transducer 101, or other elements of the multimode measuring instrument system 100 that may limit the ability of the instrument to provide a ratiometric measurement display value that meets predetermined criteria for range and/or resolution. Alternatively, large-valued ratiometric measurements may be displayed in a signed exponent notation. For example, using a five-digit segmented numeric display portion, a value such as "1.72E5" may be displayed.

In another potential error condition, if the user activates the reference dimension selecting button 206 while the jaw portions 217 and 218 are effectively closed and attempts to set the reference dimension such that the current measurement is effectively zero, the value of $X_{ratio}$, as determined by EQUATION 1, will be undefined because of an attempted division by zero. In one embodiment, this may be prevented by assigning an error condition and an error display to any operation that assigns zero (or a value closely approaching zero) to $X_{ref}$. For example, the signal processing and control unit 102 may be programmed such that if the user activates the reference dimension setting button 206 when the jaw portions 217 and 218 are positioned such that $X_{curr}=0$ and, thus, $X_{ref}$ would also equal zero, the display 204 will show an error message by activating elements of the display that can be readily interpreted as an error message. For example, "REF_0" may be displayed in the alphanumeric display portion 223, the display portion may blink "00000" instead of displaying the ratiometric value of one that is generally expected immediately after activating the reference dimension selecting button 206, or a message such as "Error" may be displayed.

Additionally, if the ratio $X_{ratio}$ of $X_{curr}$ to $X_{ref}$ is sufficiently small, the value of $X_{ratio}$ may require a greater display resolution than is available from the numerical display portion in order to display non-zero digits. If the number of leading zeros in $X_{ratio}$ is greater than the number of zeros that a numerical display portion is capable of displaying, the displayed value of $X_{ratio}$ may be set equal to zero. Alternatively, small-valued ratiometric measurements may be displayed in a signed exponent notation. For example, using a six-digit segmented numeric display portion, a value such as "3.68E-5" may be displayed.

In an alternative embodiment, the user may only be able to set the reference dimension $X_{ref}$ if the separation between the jaw portions 217 and 218 is greater than a predefined minimum value $X_{min}$. The most suitable value of $X_{min}$ may be determined according to the properties of the display 104, the transducer 101, or other elements of the multimode measuring instrument system 100 that may limit the ability of the instrument to provide a ratiometric measurement display value that meets predetermined criteria for resolution and accuracy.

As described above, it is desirable to display a ratio value in the ratiometric measurement mode that is as precise and meaningful as the system will allow. Additionally, it has been found that it is desirable from the standpoint of human perception and value recognition to keep the decimal point position in the displayed ratio value persistent after the reference dimension $X_{ref}$ has been set. Examples of this can be seen on the alphanumeric display portion 223 in FIGS. 3A and 3B, and 4A, and 4B, respectively. Having a persistent position for the decimal point helps prevent errors in reading the display because of sudden and unexpected movement of the decimal point that might otherwise occur (e.g., in some display algorithms) as the jaw portions 217 and 218 are moved to measure an object under observation. Keeping the decimal point in one place after the reference dimension $X_{ref}$ has been set also creates a more pleasant and easily read display when taking ratio measurements.

Figure 5:
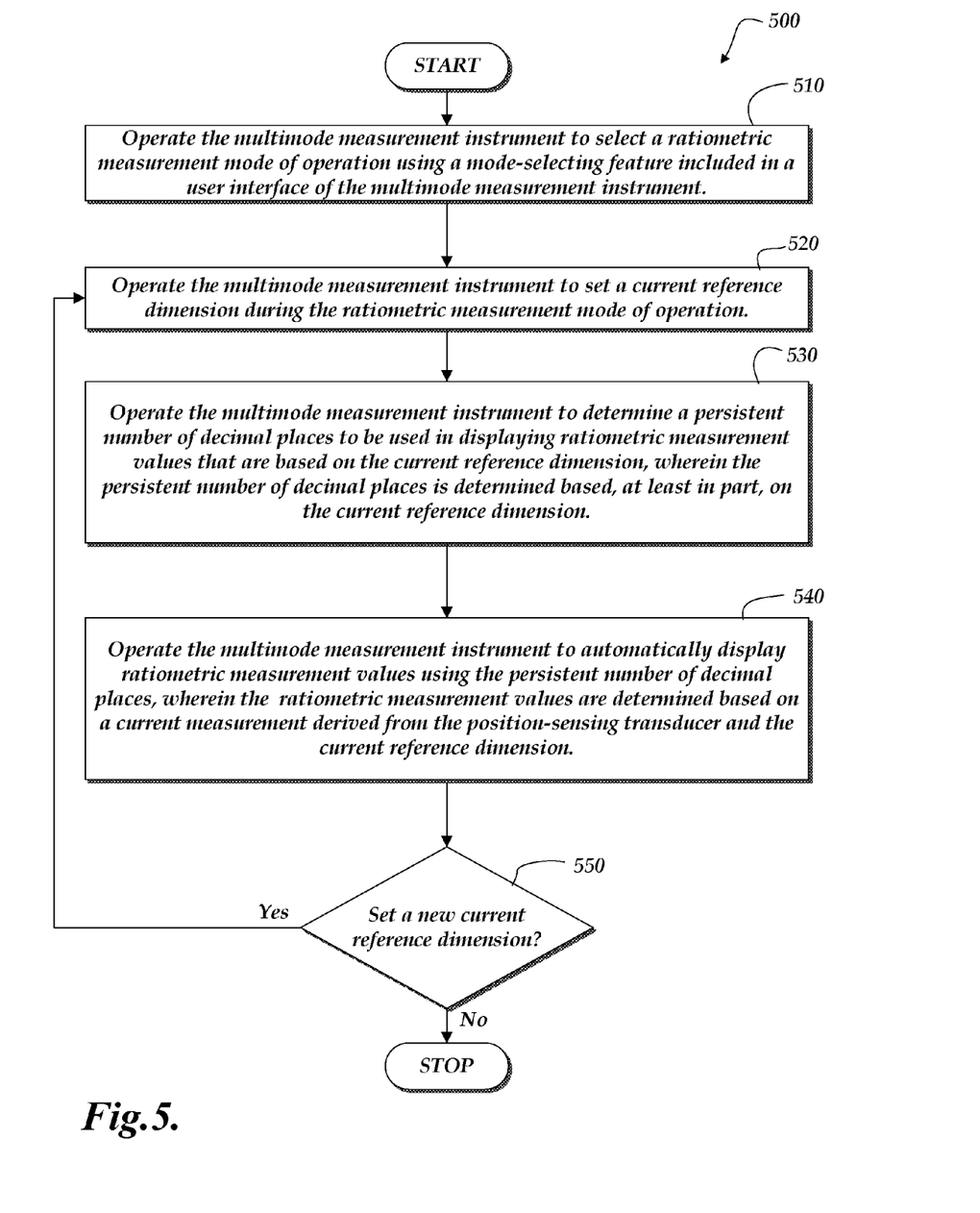
FIG. 5 is a flowchart showing a process of determining a display for measurements made in the ratiometric mode of operation.

FIG. 5 shows a method 500 for determining a number of displayed decimal places to the right of a decimal point for a ratiometric measurement display according to one exemplary embodiment of the disclosed subject matter. At a block 510, a multimode measurement instrument is operated to select a ratiometric measurement mode of operation using a mode-selecting feature included in a user interface of the multimode measurement instrument (e.g., using the previously described mode selecting element 105 or mode-selecting button 205, in one embodiment). At a block 520, the multimode measurement instrument is operated to set a current reference dimension during the ratiometric measurement mode of operation. In some embodiments, for the operations of the block 520, the current reference dimension may be automatically set to a measurement value corresponding to a measurement position of multimode measuring instrument at the time that the ratiometric measurement mode of operation is selected at block 510, similarly to previously outlined embodiments. In some embodiments, the user interface of the multimode measurement instrument may comprise a reference dimension setting element (e.g., the previously described origin-selecting element 105 or origin-selecting button 206, in one embodiment) configured such that the user may activate the reference dimension setting element to set or replace the current reference dimension at various times in order to perform the operations at the block 520.

At a block 530, the multimode measurement instrument is operated to determine a persistent number of decimal places to be used in displaying ratiometric measurement values that are based on the current reference dimension, wherein the persistent number of decimal places is determined based, at least in part, on the current reference dimension. As previously outlined, in various embodiments the number of decimal places may be automatically determined based on the current reference dimension and several pre-chosen factors, as described in more detail below. For example, these factors may include an increment used for the least significant digit of the displayed ratiometric measurement values, an internal measurement resolution of the multimode measurement instrument, a number base that is to be used for displaying the ratiometric measurement value (e.g., base 10), in various embodiments. In addition, in various embodiments, one of the criteria that may be applied when determining the number of decimal places is that the increment used for displaying the least significant digit (e.g., a "conventional" increment of 1, in some embodiments) corresponds to a measurement increment that is at least as large as the internal measurement resolution of the multimode measurement instrument. In some embodiments, at least the increment used for the least significant digit of the displayed ratiometric measurement values may be determined in combination with the persistent number of decimal places determined at the block 530 as one method of satisfying the aforementioned criterion.

At a block 540, the multimode measurement instrument is operated to automatically display ratiometric measurement values using the persistent number of decimal places determined at the block 530, wherein the ratiometric measurement values are determined based on a current measurement derived from the position-sensing of the transducer multimode measurement instrument and the current reference dimension. As previously outlined, the displayed ratiometric measurement values are approximately equivalent to the current measurement divided by the reference dimension, regardless of whether the algorithm used to determine the ratiometric measurement takes the form of a conventional division operation, or not.

The decision block 550 is an optional block in some embodiments. In some embodiments the user may choose to establish a new current reference dimension while the multimode measurement instrument is operated in the ratiometric mode. In some such embodiments, at a decision block 550, if a new current reference dimension is to be set, then the operations loop back to the block 520. If a new reference dimension is not to be set, then new operations need not be implemented, and the method may stop. It will be appreciated that when a new current reference dimension is set by returning to the block 520, then the operations of blocks 530 and 540 are subsequently repeated using the new current reference dimension, to provide an advantageous ratiometric display according to previously outlined principles.

In one embodiment of block 530 of the method 500 shown in FIG. 5, the persistent number of decimal places that is to be shown on the alphanumeric display 223 is determined such that it corresponds or conforms to the equation:

$$DEC = \left\lfloor \log_{base}\left(\frac{X_{ref} * INC}{RES}\right) \right\rfloor \quad \text{(Eq. 2)}$$

In the argument of the log function shown in EQUATION 2, the reference dimension $X_{ref}$ (e.g., as determined by one of the methods outlined previously) is multiplied by an increment factor INC that is the minimum increment to be used for changing the least significant digit on the alphanumeric display portion 223, and divided by the internal measurement resolution, RES, of the multimode measuring instrument system 100. The logarithmic function value, in a predetermined base value corresponding to the base value to be used for the alphanumeric display 223 (e.g., most commonly base 10), is calculated for the argument of the log function. To determine the persistent number of decimal places, DEC, the floor of the computed logarithmic function value is calculated. One of ordinary skill in the art will recognize that the floor function is a rounding down function to the nearest integer value. It will be appreciated that in some embodiments, the persistent number of decimal places may be determined by implementing EQUATION 2. However, in other embodiments, other algorithms or equations may be implemented to give a similar result that still corresponds or conforms to EQUATION 2.

Regarding the increment factor INC, when determining a ratio value $X_{ratio}$ as the jaw portions 217 and 218 move, the display will instantaneously and continuously change with each movement. Based on these movements, the ratio value $X_{ratio}$ displayed must be increased or decreased. The INC value determines by what increment the ratio value $X_{ratio}$ will be incremented and decremented in the alphanumeric display 223 when the jaw portions 217 and 218 are moved.

In one advantageous embodiment of the disclosed subject matter, when the ratiometric measurement values are displayed as base-10 numbers, the INC value may be chosen from the values 1, 2, or 5. That is, the least significant digit of the ratio value $X_{ratio}$ displayed on the alphanumeric display portion 223 will be increased or decreased by 1, 2, or 5 units as the jaw portions 217 and 218 move. One benefit of choosing the INC value from the values 1, 2, or 5 is that each of these values is a factor of 10, thus incrementing a base 10 display in a way that is readily perceived and understood, for various display resolutions. Despite this benefit, however, one of ordinary skill will recognize that the INC value may be chosen based on whatever increment value is desirable.

The value RES is the operative internal measurement resolution of the multimode measuring instrument system 100.

For example, if the multimode measuring instrument system 100 includes a linear position measuring transducer and electronics that is internally capable of a 0.01 mm measurement resolution, then the value RES will be 0.01 mm One of ordinary skill will recognize that the value for RES is a function of the capabilities of the multimode measuring instrument system 100. If the multimode measuring instrument system 100 is designed to measure very small objects, then a very fine and precise measuring resolution is required. In such an instance, the RES value will correspondingly be small to conform to the capabilities and requirements of the multimode measuring instrument system 100. On the other hand, if the multimode measuring instrument system 100 is designed to measure large objects, then there is less of a requirement for very fine and precise measuring, and the resolution of the multimode measuring instrument system 100 may be larger or coarser; thus RES, too, will be larger.

Additionally, the logarithmic function of EQUATION 2 may use any base that corresponds to the number-base displayed on the alphanumeric display portion 223. In most instances, this will be a base-10 value since humans most readily and easily use a base-10 number system. However, alternatives, such as a base-16, i.e., hexadecimal, number system are possible and fully contemplated in the disclosed subject matter. If a base-16 number system is used in EQUATION 2, then the corresponding output on the alphanumeric display portion 223 will also be in base-16.

Once all of the variables of EQUATION 2 are known, the number of decimal places, DEC, may then be calculated for display. As seen in FIGS. 3A and 3B, for example, it is clear from EQUATION 1 how a large reference dimension, such as dimension 320, in combination with a small RES value can result in a larger number of decimal places (to the right of the decimal point) being chosen for display. As an example of the implementation of EQUATION 2, assume that in FIG. 3A the reference dimension $X_{ref}$ is equal to 75 mm, INC is equal to 2, and RES is equal to 0.01 mm Using EQUATION 2, taking the log, in base-10, of the quantity (75*2/0.01) gives a value of 4.18. Completing EQUATION 2 and taking the floor of 4.18 gives the value of 4. Thus, with the reference dimension equal to 75 mm, the INC value equal to 2, and the RES value equal to 0.01 mm, the number of decimal places to be displayed on the alphanumeric display equals four (4). As a result, the alphanumeric display portion 223 should initially display the value "1.0000."

Now, as seen in FIG. 3B, the ratio value of the small object 360 to the reference object 340 is desired. To make this measurement, the jaw portions 217 and 218 will surround the small object 360 so that the transducer 101 can read and use the current measurement dimension 350. Once the current measurement dimension 350 is known, it is assigned to the value $X_{curr}$. Next, the $X_{ref}$ value that was previously stored in memory 110 is accessed to determined the ratio value $X_{ratio}$. Using EQUATION 1 to determine the ratio value $X_{ratio}$ as seen in FIG. 3B gives a result of 0.0212.

Since the number of decimal places, DEC, was calculated to be four in FIG. 3A, the output of the $X_{ratio}$ value will also have four decimal places. Since the increment INC value chosen was two, the least significant digit of 0.0212 is a two (2) and will be incremented and decremented by two (i.e., 0, 2, 4, 6, and 8). By way of an alternative example, if the INC value chosen would have been one (1), the number of decimal places determined from EQUATION 2 would have been equal to three (3) for FIG. 3A. As a result, the $X_{ratio}$ value displayed for the measurement taken in FIG. 3B would have been 0.021, with the least significant digit incrementing or decrementing by one (i.e., 0, 1, 2, 3, 4, 5, 6, 7, 8, and 9). As can be seen, the use of appropriately determined decimal places and the increment value for displaying the ratio value $X_{ratio}$ can give a more precise and meaningful output having maximum resolution without exceeding the internal resolution limit of the multimode measuring instrument system 100 and displaying meaningless or unreliable least significant digits. Thus, it is advantageous to allow the system to determine the most appropriate combination of the number of decimal places DEC and the increment value INC in various embodiments.

In one embodiment according to the disclosed subject matter, it may be desirable to compare results based on more than one increment value INC to determine the most precise number of decimal places DEC possible. For example, similar to the example above, where $X_{ref}$ is 75 mm and RES is 0.01 mm, EQUATION 2 may be used to determine the number of decimal places DEC for INC values of 1, 2, and 5. Using EQUATION 2, an INC value of 1 gives a DEC value of 3; an INC value of 2 gives a DEC value of 4; and an INC value of 5 gives a DEC value of 4. Since the more decimal places shown on the alphanumeric display portion 223 will allow a more precise ratio value $X_{ratio}$, assuming that measurement range is a limiting factor, an INC value of either 2 or 5 is preferred because it results in 4 decimal places being displayed (as compared to 3). Further, to have the most precise measurement possible, the least amount of incremental increase or decrease is desired. Thus, using the smaller of the two INC values (2 and 5) is desirable in this example. Based on the foregoing example, one skilled in the art may determine other implementations that provide the most desirable combination of INC and DEC for a given reference dimension and set of operating constraints.

Figure 6:
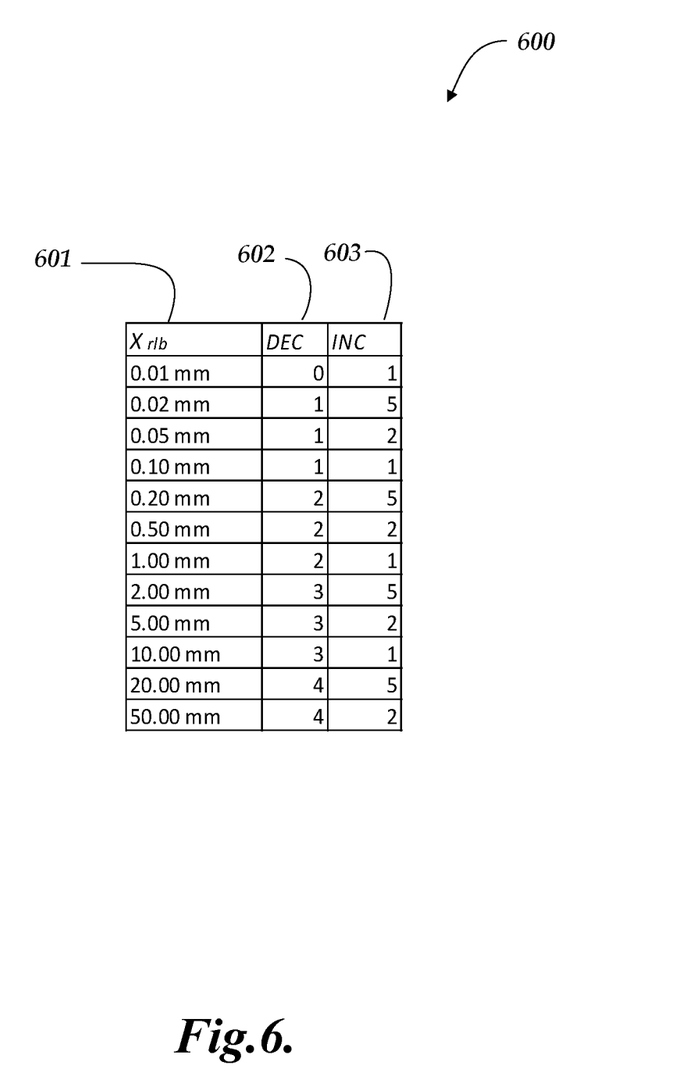
FIG. 6 is an illustration showing a look-up table storing various values used in determining a display in a ratiometric mode of operation.

In another embodiment for determining an increment value and the total number of decimal places to display, a lookup table 600 may be employed, as seen in FIG. 6. For example, the lookup table 600, or the like, may be used to implement operations at the block 530 of FIG. 5. Briefly, the lookup table 600 comprises sets of related values, and each set of related values comprises a value DEC (column 602) which is a permissible persistent number of decimal places, and a value INC (column 603) which is a permissible increment used for the least significant digit of the displayed ratiometric measurement values. In addition, each set of related values includes a value $X_{rlb}$, (column 601) which is a lower bound criterion for current reference dimensions that are permissible with the values DEC and INC of that set of related values. When using the lookup table 600, determining the persistent number of decimal places and the increment used for the least significant digit of the displayed ratiometric measurement values comprises comparing the current reference dimension to the lower bound criteria $X_{rlb}$ of the lookup table and identifying the appropriate set of related values such that its lower bound criterion $X_{rlb}$ is the largest lower bound criterion $X_{rlb}$ that is less than or equal to the current reference dimension. The persistent number of decimal places is then set to be the same as the value DEC included in that appropriate set of related values and setting the increment used for the least significant digit of the displayed ratiometric measurement values to be the same as the value of INC included in that appropriate set of related values.

In general, the sets of related values included in the lookup table 600 may be determined such that they correspond or conform to the equation:

$$X_{rlb} = \frac{Base^{DEC} * RES}{INC} \quad \text{(Eq. 4)}$$

FIG. 6 shows a particular embodiment of a lookup table wherein RES is assumed to be 0.01 mm, the permissible values of INC are limited to 1, 2, and 5 (e.g., for reasons outlined previously), and the permissible values for DEC are limited to be at most 4 (e.g., due to a limited number of digits in a display). Furthermore, some alternative sets of related permissible values have been eliminated from the table because they provide poorer resolution than the retained set for a particular value of $X_{rlb}$.

As seen in FIG. 6, the first lower-bound reference dimension $X_{rlb}$ value in the lookup table 600 may correspond to the RES value, or the internal measuring resolution for the multimode measuring instrument system 100. Additionally, the largest $X_{rlb}$ value in the lookup table 600 may be limited in relation to the maximum range the multimode measuring instrument system 100 can measure. As seen in FIG. 6, the $X_{rlb}$ column 601 only has two decimal places to the right of the decimal point. This is because the minimum resolution RES of the multimode measuring instrument system 100 is assumed to be 0.01 mm, in this example, and two decimal places are sufficient for expressing this resolution.

One of ordinary skill in the art will recognize that the actual numerical values and the range of lower bounds included in the table in FIG. 6 may be determined to correspond to the design of a particular corresponding multimode caliper 200. More generally, it will be appreciated that the particular embodiment shown in FIG. 6 is exemplary only, and not limiting for various multi-mode measuring instruments. In general, once an appropriate lookup table (e.g., the lookup table 600) has been prepared as outlined above, it may be used in corresponding multimode measuring instrument (e.g., the multimode measuring instrument 200), in order to measure objects and display a ratiometric value $X_{ratio}$ in an alphanumeric display portion. It should be appreciated that the previously described exemplary embodiments are illustrative only, and not limiting. For example, the mode-selecting element 105 and the origin-setting element 106 may comprise the same physical element activated to provide different codes or signals. They may be implemented, for example, using a single button. The single button may be pressed in various manners to provide various signals that have recognizable durations and/or patterns usable to activate the desired operations of the signal processing and control unit 102. Alternatively, a simple voice-activated circuit may be used.

Furthermore, although the ratiometric measurement mode of operation described above has characteristics that are particularly well-suited to being combined in the most efficient way possible with conventional caliper operations or the like, it should be appreciated that the ratiometric measurement can be enhanced and/or used in various other ways. For example, the ratiometric measurement can be displayed as a percent of the reference dimension, or an element can be provided to activate operations that invert the ratiometric measurement (that is, the operation $1/X_{ratio}$ can be performed) and display the inverted value and a corresponding "invert" indicator. Such an inverted value may be useful in certain applications. Furthermore, the ratiometric measurement operation disclosed herein may also be used as the sole operating mode of a ratiometric measuring instrument, if desired. Thus, while various preferred and exemplary embodiments of the invention have been illustrated and described, it will be appreciated that various changes can be made therein without departing from the spirit and scope of the invention.

The embodiments of the disclosed subject matter in which an exclusive property or privilege is claimed are defined as follows:

1. A method for displaying a ratiometric measurement value in a multimode measurement instrument comprising a position-sensing transducer, the multimode measurement instrument having an internal measurement resolution, the method comprising:
   (a) operating the multimode measurement instrument to select a ratiometric measurement mode of operation using a mode-selecting feature included in a user interface of the multimode measurement instrument;
   (b) operating the multimode measurement instrument to set a reference dimension during the ratiometric measurement mode of operation;
   (c) for each reference dimension usable in the ratiometric measurement mode of operation, operating the multimode measurement instrument to determine a persistent number of decimal places to be used in displaying ratiometric measurement values that are based on the set reference dimension, wherein the persistent number of decimal places is determined based, at least in part, on the set reference dimension such that the persistent number of decimal places persists throughout the ratiometric measuring mode of operation for displaying any ratiometric measurement value based on the set reference dimension; and
   (d) operating the multimode measurement instrument to automatically display ratiometric measurement values using the persistent number of decimal places, wherein the ratiometric measurement values are determined based on a measurement derived from the position-sensing transducer and the current set reference dimension.

2. The method of claim 1, wherein the displayed ratiometric measurement values are approximately equivalent to the current measurement divided by the set reference dimension, and the persistent number of decimal places is determined such that an increment used for the least significant digit of the displayed ratiometric measurement values corresponds to a measurement increment that is at least as large as the internal measurement resolution of the multimode measurement instrument.

3. The method of claim 2, wherein the least significant digit of the displayed ratiometric measurement values corresponds to a measurement increment that is at least as large as 0.01 millimeters.

4. The method of claim 3, wherein the persistent number of decimal places is determined such that it corresponds to the equation $$DEC = \left\lfloor \log_{base}\left(\frac{X_{ref} * INC}{RES}\right)\right\rfloor,$$

wherein DEC is the persistent number of decimal places, $X_{ref}$ is the set reference dimension, INC is the increment used for the least significant digit of the displayed ratiometric measurement values, RES is the internal measurement resolution of the multimode measurement instrument, base is the numeric base of the logarithmic function and is the same as the numeric base used for displaying ratiometric measurement values, and the operator ⌊ ⌋ indicates application of the floor function to the value enclosed by the operator.

5. The method of claim 4, wherein base equals 10 and INC is selected from a group consisting of 1, 2, and 5.

6. The method of claim 3, wherein the increment used for the least significant digit of the displayed ratiometric measurement values is selectable, and the method comprises determining the increment used for the least significant digit of the displayed ratiometric measurement values in combination with determining the persistent number of decimal places.

7. The method of claim 6, wherein the increment used for the least significant digit of the displayed ratiometric measurement values is selected from a group consisting of 1, 2, and 5.

8. The method of claim 6, wherein the persistent number of decimal places and the increment used for the least significant digit of the displayed ratiometric measurement values are determined based on a lookup table.

9. The method of claim 8, wherein:
the lookup table comprises sets of related values, and each set of related values comprises:
a value DEC which is a permissible persistent number of decimal places;
a value INC which is a permissible increment used for the least significant digit of the displayed ratiometric measurement values; and
a value $X_{rib}$ which is a lower bound criterion for set reference dimensions that are permissible with the values DEC and INC of that set of related values, and
determining the persistent number of decimal places and the increment used for the least significant digit of the displayed ratiometric measurement values comprises:
comparing the set reference dimension to the lower bound criteria $X_{rib}$ of the lookup table and identifying the appropriate set of related values such that its lower bound criterion $X_{rib}$ is the largest lower bound criterion $X_{rib}$ that is less than or equal to the set reference dimension; and
setting the persistent number of decimal places to be the same as the value DEC included in that appropriate set of related values and setting the increment used for the least significant digit of the displayed ratiometric measurement values as the value of INC included in that appropriate set of related values.

10. The method of claim 9, wherein:
a plurality of sets of related values in the lookup table are populated in a manner consistent with the equation $$X_{rib} = \frac{Base^{DEC} * RES}{INC},$$

wherein RES is the internal measurement resolution of the multimode measurement instrument, and Base is the numeric base used for displaying ratiometric measurement values.

11. The method of claim 10, wherein Base is equal to 10.

12. The method of claim 1, wherein when step (a) is performed, then step (b) is performed automatically such that the reference dimension is set to a measurement value corresponding to a measurement position of the multimode measuring instrument at the time that the ratiometric measurement mode of operation is selected in step (a).

13. The method of claim 1, wherein if step (b) is repeated during the ratiometric measurement mode of operation such that a new reference dimension is set, then steps (c) and (d) are subsequently performed based on the new set reference dimension.

14. The method of claim 13, wherein the user interface of the multimode measurement instrument comprises a reference dimension setting element configured such that the user may activate the reference dimension setting element to set the new reference dimension.

15. A multimode measurement instrument having at least two relatively moveable members for making measurements, the multimode measurement instrument comprising:
a display configured to display the measurements made from a relationship between the at least two relatively moveable members;
a mode-selecting element configured to select a ratiometric mode of operation; and
a control element configured to automatically cause the display to show a ratiometric number based on the relationship between the at least two relatively moveable members and a reference dimension set in the ratiometric mode of operation, wherein for each reference dimension usable in the ratiometric measurement mode of operation, the ratiometric number has a persistent number of decimal places determined, at least in part, by the reference dimension such that the persistent number of decimal places persists throughout the ratiometric mode of operation for displaying any ratiometric number based on that reference dimension.

16. The multimode measurement instrument of claim 15, further comprising an origin-setting element configured to set the reference dimension.

17. The multimode measurement instrument of claim 16, wherein the mode-selecting element and the origin-setting element are chosen from a group consisting of a button, a miniature touch-screen element, and a voice-activated control circuit, and at least one of the mode-selecting element and the origin-setting element is operable by a single operation, including activating each element a single time, in order to cause the control element to set the reference dimension.

18. The multimode measurement instrument of claim 15, wherein the mode-selecting element is chosen from a group consisting of a button, a miniature touch-screen element, and a voice-activated control circuit, and the mode-selecting element is operable by a single operation, including activating the mode-selecting element a single time, in order to both select the ratiometric mode of operation and cause the control element to set the reference dimension simultaneously.

19. The multimode measuring instrument of claim 15, further comprising a conventional measurement mode for making one of linear measurements and angular measurements in conventional units, in addition to making one of linear and angular ratiometric measurements.

20. The multimode measuring instrument of claim 19, wherein the multimode measuring instrument is a handheld battery-powered electronic caliper for making linear measurements.

* * * * *

UNITED STATES PATENT AND TRADEMARK OFFICE
CERTIFICATE OF CORRECTION

| | |
|---|---|
| PATENT NO. | : 8,745,108 B2 |
| APPLICATION NO. | : 12/633697 |
| DATED | : June 3, 2014 |
| INVENTOR(S) | : B. Jansson |

It is certified that error appears in the above-identified patent and that said Letters Patent is hereby corrected as shown below:

| COLUMN | LINE | ERROR |
|---|---|---|
| Title Page 1 Item (75) | 5 | "Snorhomish, WA (US)" should read --Snohomish, WA (US)-- |
| In the Claims | | |
| 18 (Claim 1, | 36 line 29) | "a measurement" should read --a current measurement-- |
| 18 (Claim 1, | 37 line 30) | "the current set" should read --the set-- |

Signed and Sealed this
Seventh Day of April, 2015

Michelle K. Lee
*Director of the United States Patent and Trademark Office*